Dec. 28, 1926.
H. L. TURNEY
1,612,239
SPEED CHANGING DEVICE
Filed August 11, 1923   2 Sheets-Sheet 1
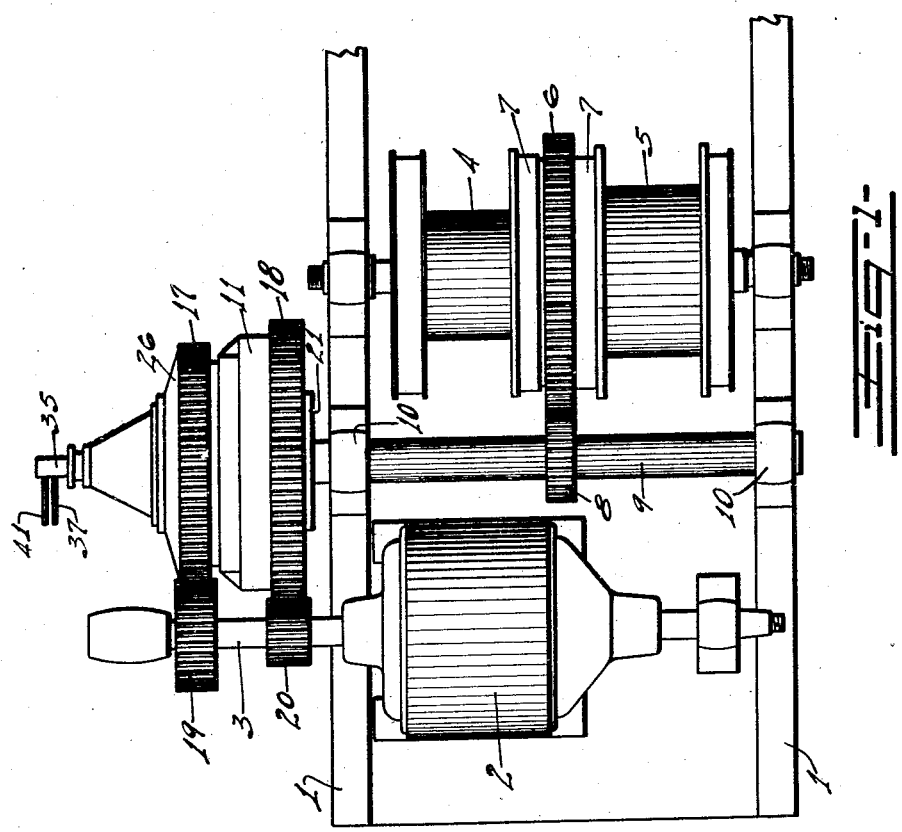
Inventor
Harry L. Turney
by
Attorney

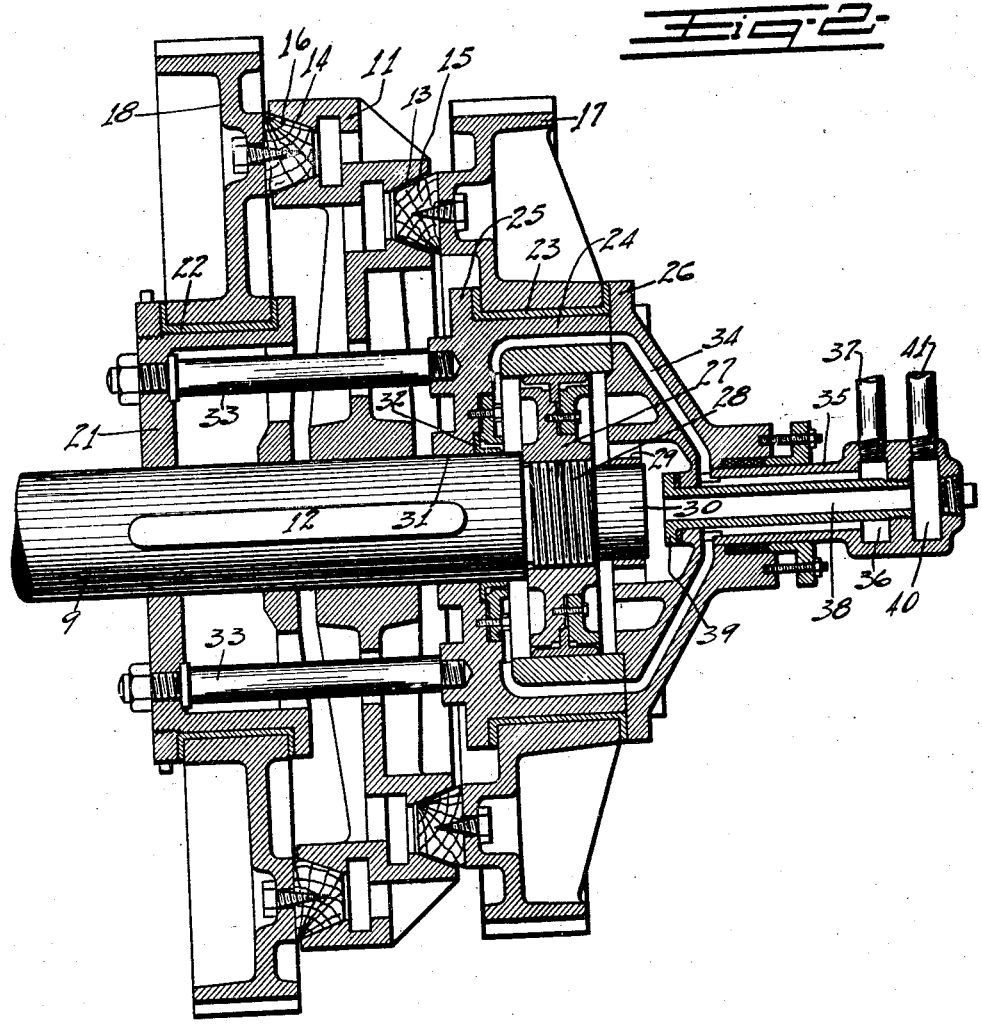

Patented Dec. 28, 1926.

1,612,239

UNITED STATES PATENT OFFICE.

HARRY L. TURNEY, OF PORTLAND, OREGON.

SPEED-CHANGING DEVICE.

Application filed August 11, 1923. Serial No. 656,384.

It is desirable to mount the speed changing mechanism of some devices outside the bearing and where this speed changing mechanism is power-actuated as with a fluid actuated motor the weight of the parts outside of the bearing makes it desirable to make the device as compact as possible so that the overhang may be reduced to a minimum. In the present invention such a device is shown in which there is an overlapping of the operative parts so as to reduce the overhang. This and other features which will be described in the specification form the objects of this invention.

The invention is illustrated in the accompanying drawings as follows:—

Fig. 1 is a plan view of a speed changing device associated with a hoisting or logging engine.

Fig. 2 a central section through the speed changing device.

1 marks the frame, 2 an electric motor mounted on the frame for driving the mechanism, 4 and 5 drums mounted in the frame, 6 a gear driving the drums 4 and 5 through friction clutches 7—7 in the usual manner, 8 a gear meshing with the gear 6, 9 a shaft on which the gear 8 is fixed, and 10 bearings for the shaft 9.

The shaft 9 overhangs the bearing 10 and the speed changing device is mounted on this, the over-hung part of the shaft, and comprises a driver carrier 11 keyed on the shaft by a key 12. Driving cone clutch surfaces 13 and 14 are arranged on the carrier and operate in connection with friction cone surfaces 15 and 16. The surfaces 15 and 16 are carried by gears 17 and 18, these gears being adapted to be moved axially along the shaft to set or release the friction clutches alternately. The gears 17 and 18 mesh with gears 19 and 20 respectively on the rotor shaft 3 of the motor 2.

The gear 18 is mounted on a sliding bushing 21, the bushing being provided with a grooved bearing 22 which permits the rotation of the gear 18 on the bearing but locks the gear against axial movement relatively to the bushing.

The gear 17 is mounted on a bearing 23 arranged on the walls of a cylinder 24. The cylinder has a shoulder 25 at one side of the bearing and a cover 26 of the cylinder extends outwardly at the opposite end of the bearing thus locking the gear 17 against axial movement relatively to the cylinder but permitting its rotation thereon.

A piston 27 is arranged in the cylinder. It is secured on the screw-threaded end 28 of the shaft 9. The cover is provided with a bearing 29 which is mounted on the bearing end 30 of the shaft thus affording a support for the outer end of the cylinder and relieving the piston of this added load. The inner end of the cylinder is mounted at 31 on the shaft 9 and is provided with a packing 32 making a steam-tight joint with the shaft. Pins 33 connect the cylinder with the bushing 21 so that the gears 17 and 18 move axially with the cylinder.

A port 34 extends to the inner end of the cylinder and communicates with a nozzle 35. The nozzle 35 terminates in a chamber 36 from which a fluid or steam pipe 37 extends. An inner nozzle 38 extends through the nozzle 35 and has a head 39 at the inner end with an opening extending through it making a communication between the outer end of the cylinder and a chamber 40. The chamber 40 has a pipe 41 leading to it for supplying steam to the outer end of the cylinder. Any suitable controlling devices, or valves (not shown) are supplied for the pipes 37 and 41 by means of which fluid may be admitted to or exhausted from either side of the cylinder so that the cylinder acting under the influence of this fluid is moved axially relatively to the piston and to the shaft 9 carrying with it the gears 17 and 18 to throw the gears 17 and 18 alternately into and out of engagement with the driver. In this way the speed of the device may be changed while in motion and accurately controlled. The general arrangement of the speed changing device and clutches do not form a part of this invention, this invention being directed to the particular mounting of the device so as to permit of its installation on the overhanging end of the shaft.

What I claim as new is:—

1. In a speed changing device, the combination of a shaft; a driver on the shaft; gears mounted on the shaft; clutches between the gears and the driver adapted to be thrown alternately into engagement; a bearing for the shaft; a fluid actuated device mounted on the end of the shaft and outside the bearing comprising a cylinder and a piston actuating said clutches; and a bearing for one of the gears on the walls of the cylinder.

2. In a speed changing device, the combination of a shaft; a driver on the shaft; gears mounted on the shaft; clutches between the gears and the driver adapted to be thrown alternately into engagement; a bearing for the shaft; a fluid actuated device mounted on the end of the shaft and outside the bearing comprising a cylinder and a piston actuating said clutches, said cylinder having a bearing on the shaft at each side of the piston; and a bearing for one of the gears on the walls of the cylinder.

3. In a speed changing device, the combination of a shaft; the driver on the shaft; gears mounted on the shaft; clutches between the gears and the driver adapted to be thrown alternately into engagement; a bearing for the shaft; a fluid actuated device mounted on the end of the shaft comprising a piston fixed on the shaft, and a cylinder in which the piston is mounted, said cylinder being slidingly mounted relatively to the shaft on bearings at each side of the piston; a bearing for one of the gears arranged on the walls of the cylinder, said bearing permitting the rotation of the gear on the cylinder but locking it against axial movement relatively thereto; and a connection between the cylinder and the other of said gears.

4. In a speed changing device, the combination of a shaft; a driver on the shaft; gears mounted on the shaft; clutches between the gears and the driver adapted to be thrown alternately into engagement; a piston on the shaft, and a cylinder in which the piston is mounted, said cylinder being slidingly mounted relatively to the shaft; a bearing for one of the gears arranged on the walls of the cylinder, said bearing permitting the rotation of the gear on the cylinder but locking it against axial movement relatively thereto; and a connection between the cylinder and the other of said gears.

In testimony whereof I have hereunto set my hand.

HARRY L. TURNEY.